United States Patent [19]

Zink

[11] Patent Number: 5,291,987
[45] Date of Patent: Mar. 8, 1994

[54] CONVEYOR FOR RAISING AND LOWERING ARTICLES

[75] Inventor: Arden K. Zink, Louisville, Nebr.

[73] Assignee: Millard Manufacturing Corp., Omaha, Nebr.

[21] Appl. No.: 36,715

[22] Filed: Mar. 25, 1993

[51] Int. Cl.$^5$ ............................................. B65G 35/00
[52] U.S. Cl. ...................................... 198/724; 198/778
[58] Field of Search ................................. 198/724, 778

[56] References Cited

U.S. PATENT DOCUMENTS

| | | | |
|---|---|---|---|
| 772,078 | 10/1904 | Baker | 198/724 X |
| 1,758,994 | 5/1930 | Veomans | 198/724 |
| 2,628,708 | 2/1953 | Wahl et al. | 198/724 |
| 3,295,666 | 1/1967 | Kay et al. | 198/724 |
| 3,306,432 | 2/1967 | Hoagland | 198/724 |
| 3,908,333 | 9/1925 | Cavanna | 198/461 X |
| 4,756,403 | 7/1988 | Sasaki et al. | 198/724 |

Primary Examiner—Cheryl L. Gastineau
Attorney, Agent, or Firm—Zarley, McKee, Thomte Voorhees & Sease

[57] ABSTRACT

A conveyor for raising or lowering articles thereon comprising a vertically disposed central column which is rotatable about a vertical axis and which has a plurality of radially spaced apart push bar assemblies mounted thereon. A spiral bed extends around the outer periphery of the rotating central column and is adapted to support the articles to be conveyed thereon. Each of the push bar assemblies has a freely movable endless chain provided thereon from which extend bars which rest upon the upper surface of the spiral bed and which move upwardly along the spiral bed as the central column is rotated in one direction and which move downwardly along the spiral bed when the central column is rotated in an opposite direction. Entry and exit conveyors are associated with the conveyor to supply articles to be conveyed thereto and for receiving the conveyed articles therefrom.

2 Claims, 8 Drawing Sheets

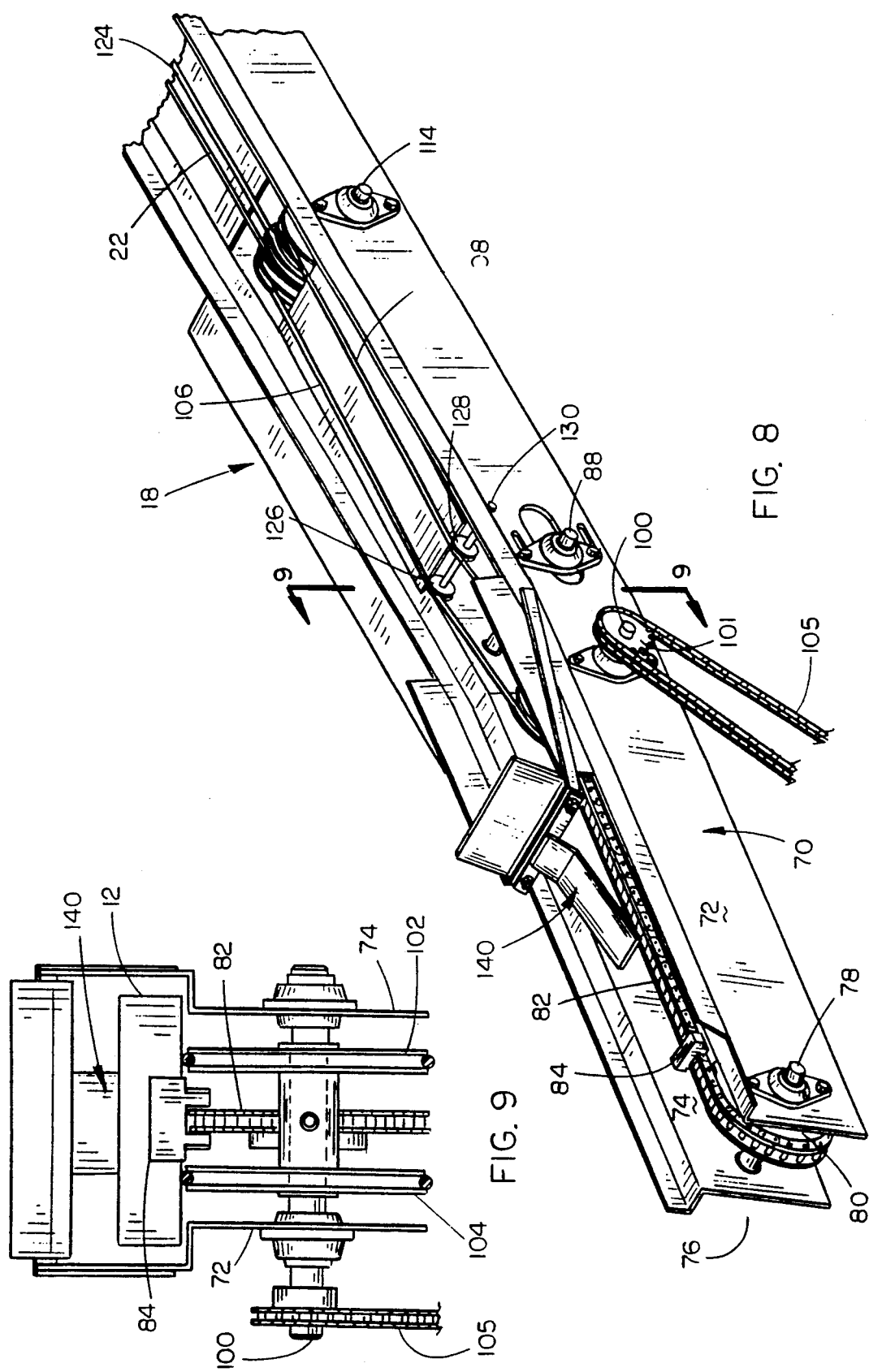

CONVEYOR FOR RAISING AND LOWERING ARTICLES

BACKGROUND OF THE INVENTION

1. Field of the Invention

This invention relates to a conveyor for raising and lowering articles having numerous physical shapes and sizes such as cans, cartons, cases, etc.

2. Background Information

Many types of conveyors have been previously provided for raising or lowering cans, bottles, etc. from one location to another. Such conveyors are generally called vertical conveyors. When the conveyors are used to elevate articles from one location to a higher location, they are called elevating conveyors. When the vertical conveyors are used to lower articles from one location to a lower location, they are generally referred to as lowerators. For example, a device is described in U.S. Pat. No. 4,756,403 for lowering and lifting containers. In U.S. Pat. No. 4,756,403, the cylindrical containers are held in semi-circular recesses and are raised or lowered in those recesses by means of a spiral guide bar or inclined support means. It is believed that the device of the '403 patent could not be used or modified to handle cartons or cases due to the inclusion of the semi-circular recesses.

U.S. Pat. No. 2,628,708 discloses an article raising or lowering conveyor. As in the '403 patent, the articles in the '708 apparatus are held in recesses, with those recesses being rotated so that the bottles or cans are raised in the recesses by pusher bar assemblies. As with the '403 device, it is believed that the conveyor of the '708 patent may not be used to raise or lower articles having various physical shapes such as cartons, cases, etc.

The conveyor equipment now in use generally employs a conveyor means extending at 5° to 10° of incline. This minimum incline is needed to prevent slip-back of the article. In those elevators which only have a 5° to 10° of incline, the conveyor consumes considerable space and distance to gain elevation thereby consuming valuable floor space. The same is true of a lowerator of the same design. Another prior art method is a magnetic means which is usable only on ferrous containers. A magnetic elevator consumes less floor space but is limited to objects which are attracted to a magnet.

Other types of elevators used for larger objects employ moving platforms which drive through a frame to elevate objects from one level to another. Elevators of this type take less floor space but are limited to a slower operation.

BRIEF DESCRIPTION OF THE DRAWINGS

FIG. 8 is a partial perspective view of an entry conveyor device which may be used with the conveyor which is synchronized therewith so that the articles to be conveyed are properly supplied to the entry of the conveyor;

FIG. 9 is an enlarged sectional view as seen on lines 9—9 of FIG. 8;

FIG. 10 is a top view of the entry conveyor of FIG. 8;

FIG. 11 is a partial vertical sectional view of the entry conveyor of FIGS. 8 and 10;

SUMMARY OF THE INVENTION

Figure 1:
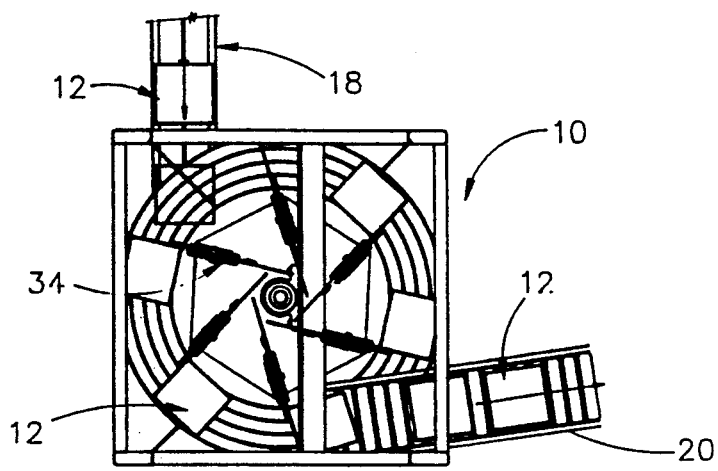
FIG. 1 is a top view of the conveyor of this invention.

A vertical conveyor is disclosed which may be used to either raise or lower articles of various shapes such as cans, bottles, cartons or cases. A vertically disposed central support or column is provided which is rotatable about a vertical axis. A plurality of vertically disposed pusher bar assemblies are operatively secured to the rotating column, for rotation therewith, and are spaced about the periphery of the rotating column in a radial, spaced-apart fashion. Each of the pusher bar assemblies includes a vertically disposed and freely movable endless chain which has a plurality of pusher bars secured thereto which normally extend laterally therefrom. A spiral support bed extends from the lower end of the conveyor to the upper end of the conveyor around the central column and is designed to support the articles to be conveyed thereon. An outer guide is associated with the spiral bed to prevent the articles from falling from the spiral bed. The pusher bars of the pusher bar assemblies rest upon the upper surface of the spiral bed. When the central column is rotated in a first direction, the pusher bars follow along the upper surface of the spiral bed and move the articles on the spiral bed upwardly from the lower end to the upper end thereof. When the central column is rotated in a direction opposite to that just described, the pusher bars move downwardly along the upper surface of the spiral bed from the upper end of the spiral bed to the lower end thereof. Thus, by varying the direction of rotation of the central column, the conveyor may be used to either elevate articles or to lower articles. An entry conveyor is also described which is synchronized with the vertical conveyor so that the articles to be conveyed are sequentially supplied to the vertical conveyor so that the pusher bars will properly engage the same.

It is therefore a principal object of the invention to provide an improved article raising or lowering conveyor.

Still another object of the invention is to provide an improved article raising or lowering conveyor which handles articles having various physical shapes and sizes such as cans, cartons, cases, etc.

Still another object of the invention is to provide an article raising or lowering conveyor which does not occupy a large amount of floor space.

Still another object of the invention is to provide an article raising or lower conveyor which operates at a very high speed.

Still another object of the invention is to provide an article raising or lowering conveyor which has the capability to store objects and to dispense them as needed.

Still another object of the invention is to provide an article raising or lowering conveyor which includes a synchronized entry conveyor device for properly positioning the articles to be conveyed.

Still another object of the invention is to provide an article raising or lowering conveyor which is durable in use.

These and other objects of the present invention will be apparent to those skilled in the art.

DESCRIPTION OF THE PREFERRED EMBODIMENT

The vertical conveyor of this invention is referred to generally by the reference numeral 10 and may be used to either lower articles or to elevate articles. The conveyor is designed to handle articles of various shapes such as cans, bottles, cartons or cases. It should also be noted that the conveyor could be modified somewhat so that it could handle different types of unfinished and finished food products such as uncooked meats, cooked meats, or any other type of similar product as will be described hereinafter.

Figure 2:
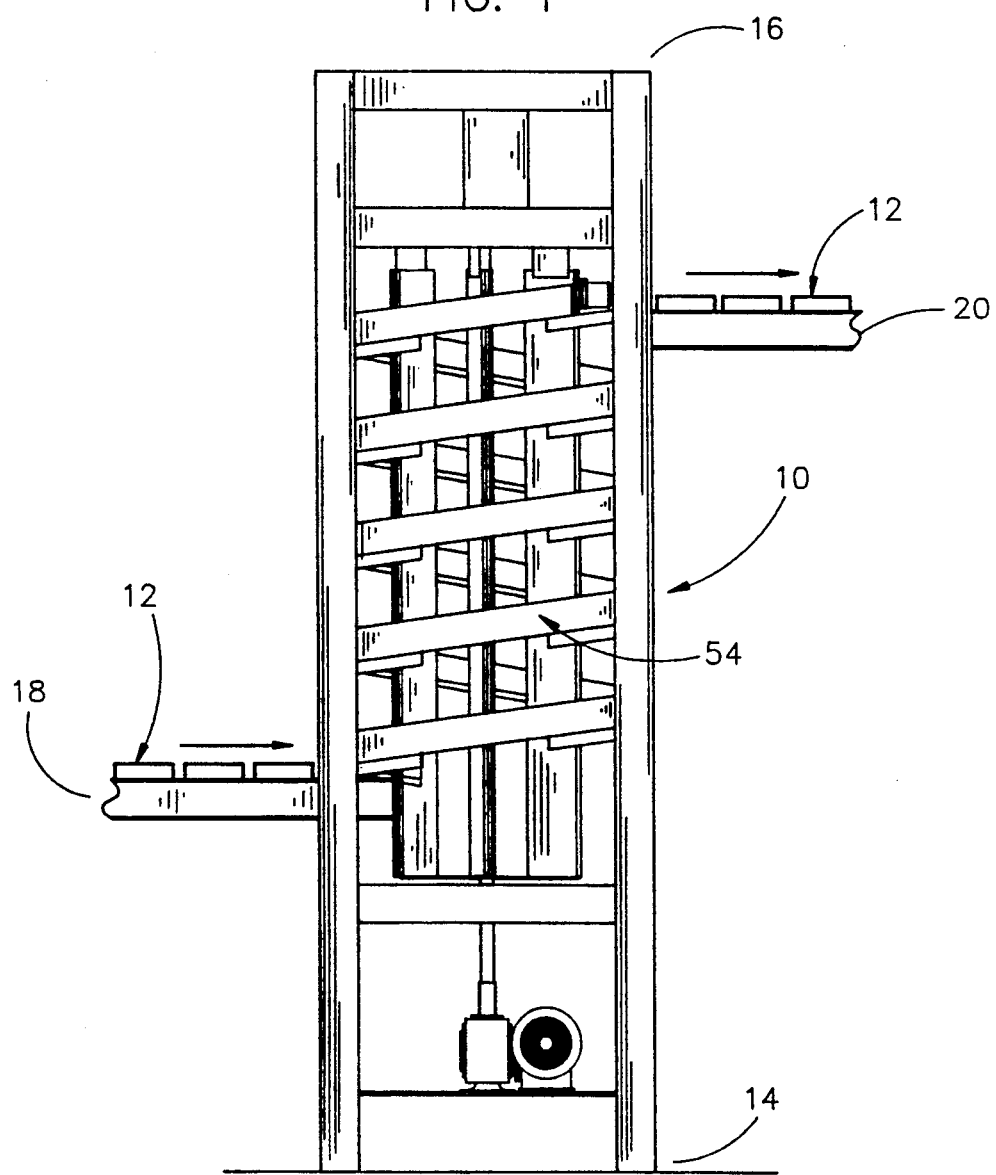
FIG. 2 is a side view of the conveyor of this invention.
Figure 3:
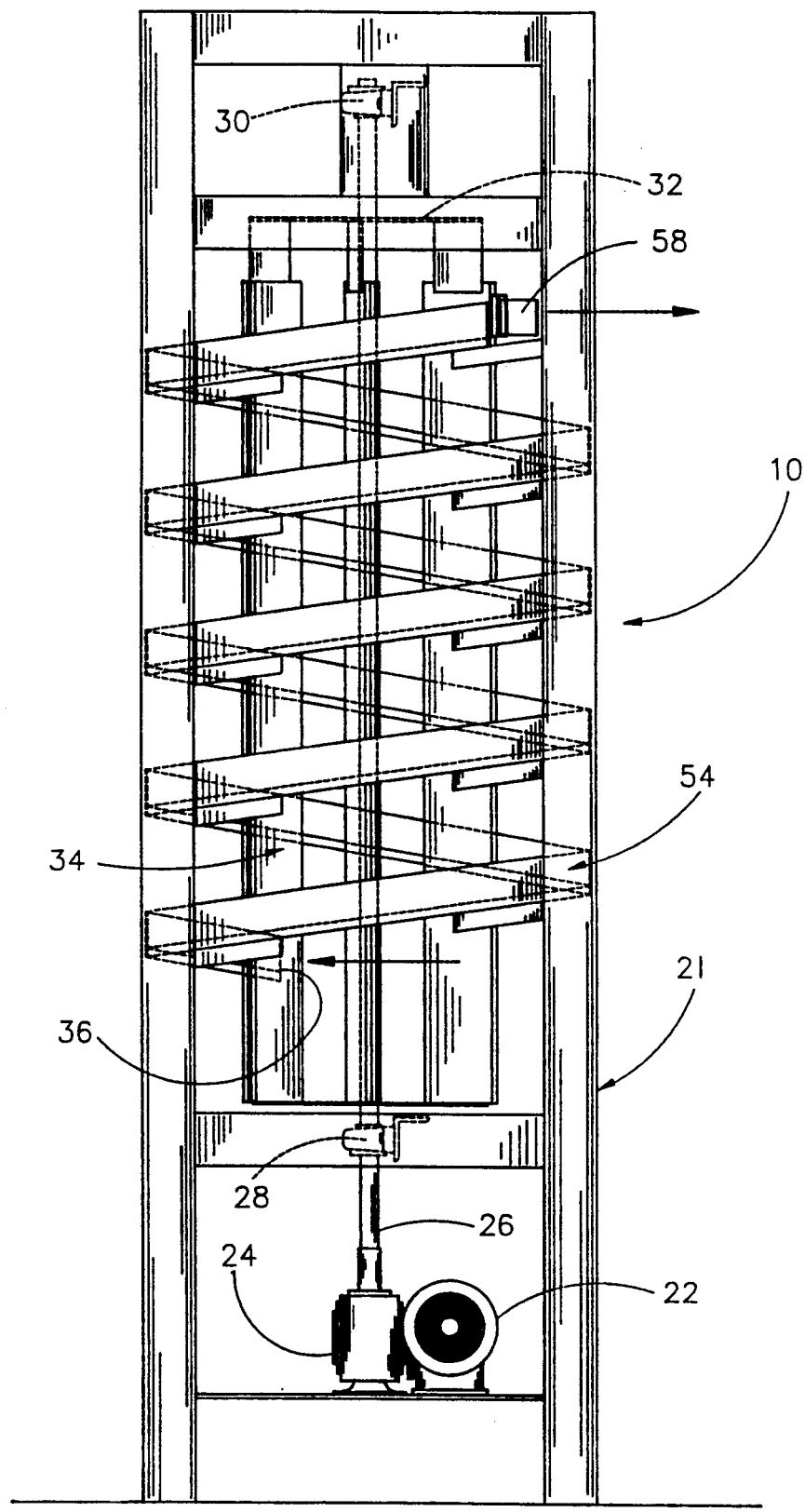
FIG. 3 is a side elevational view of the conveyor of this invention.

For purposes of illustration, the conveyor of this invention is illustrated as conveying cartons 12 such as are commonly used in the food industry. As seen in FIGS. 2 and 3, the conveyor 10 includes a lower end 14 and an upper end 16. As also seen in FIG. 2, the numeral 18 refers to an entry conveyor which is used to supply cartons 12 to the conveyor while the numeral 20 refers to an exit conveyor. The entry conveyor 12 may be of any conventional design such as commonly found in the industry but it is preferred that the entry conveyor 18 have the design illustrated in FIGS. 8-13 as will be described in more detail hereinafter. The exit conveyor 20 may be of any conventional design. When the conveyor is going to be used to elevate articles, the entry conveyor 18 will be as positioned in FIG. 2 with the exit conveyor 20 being positioned as illustrated also in FIG. 2. When the conveyor is going to be used to lower articles from the upper end to the lower end thereof, the positions of the entry conveyor and the exit conveyor 20 would be reversed. That is, the entry conveyor 18 would be at the upper end of the conveyor and the exit conveyor 20 would be at the lower end of the conveyor.

Conveyor 10 generally includes vertically disposed support means 21 having a motor 22 positioned thereon which is operatively connected to a drive box or gear box 24 having a vertically disposed rotatable shaft 26 extending therefrom which is supported in bearings 28 and 30. Central column or support 32 is operatively connected to the shaft 26 for rotation therewith and has a plurality of pusher bar assemblies 34 mounted thereon for rotation therewith. Each of the pusher bar assemblies 34 is vertically disposed and includes a pair of spaced apart plates 36 and 38 having sprockets 40 and 42 rotatably mounted therebetween at the upper and lower ends thereof respectively. Sprocket 40 is rotatably mounted on bolt 44 while sprocket 42 is rotatably mounted on bolt 46. An endless chain 48 extends around the sprockets 40 and 42 and has a plurality of supports 50 secured thereto which extend laterally therefrom. A pusher bar 52 is secured to the outer end of each of the supports 50 as illustrated in the drawings.

Figure 4:
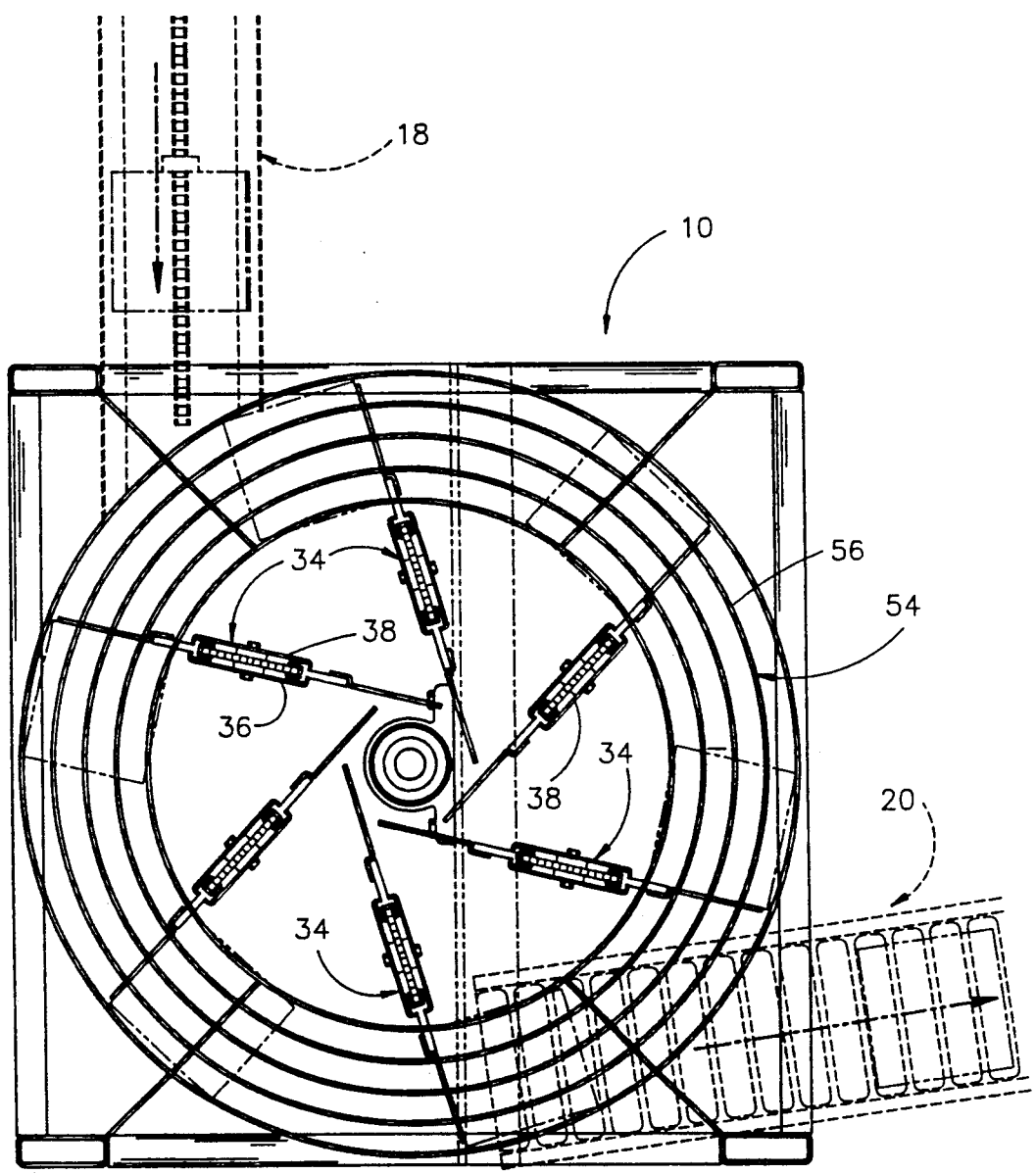
FIG. 4 is a top elevational view of the conveyor with entry and exit conveyors being illustrated in broken lines.
Figure 5:
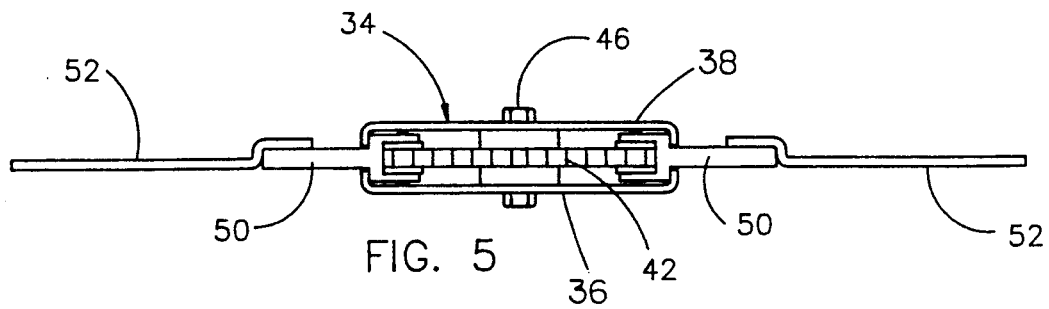
FIG. 5 is a top view of the pushing bar assembly.
Figure 6:
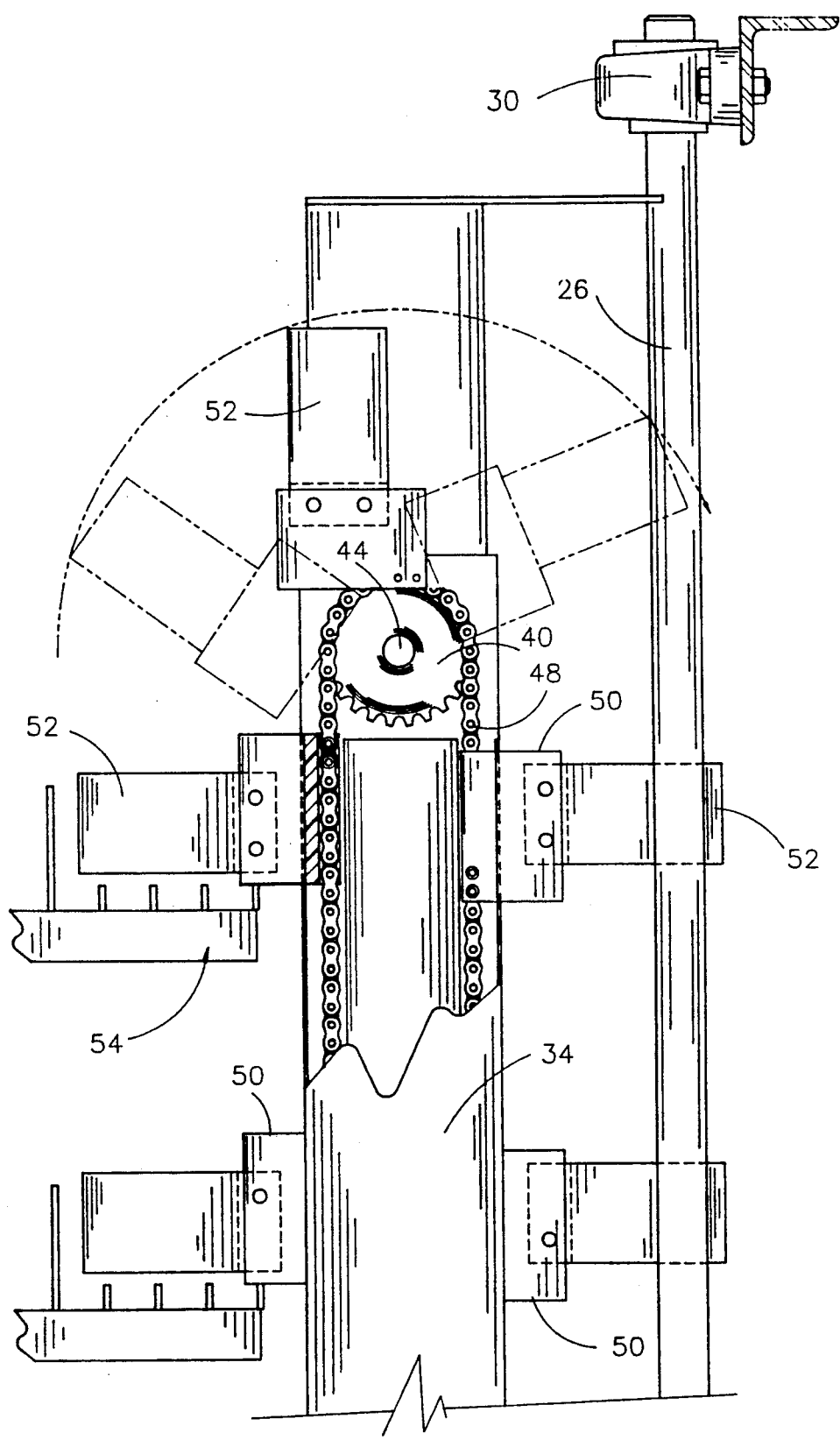
FIG. 6 is a partial side view of the conveyor with portions thereof cut away to more fully illustrate the invention.
Figure 7:
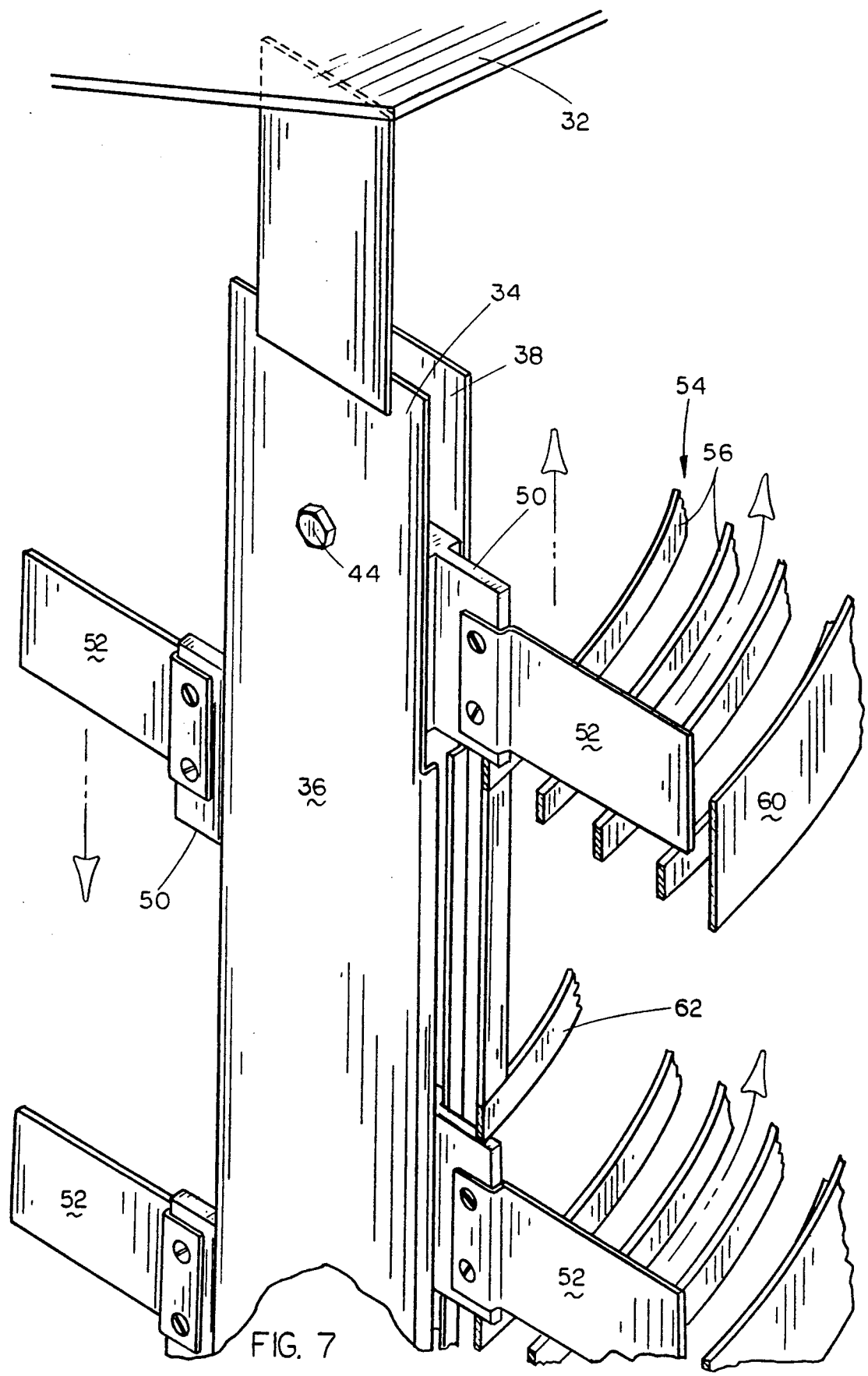
FIG. 7 is a partial perspective view of the conveyor illustrating the relationship of one pusher bar assembly to the spiral support bed.

A spiral support bed 54 comprised of individual spaced-apart rods 56 is mounted on the support means 21 and is positioned outwardly of the central column 32 as illustrated in FIG. 4. Spiral bed 54 has an open lower end 56 and open upper end 58. Guide 60 is provided at the outer end of spiral bed 54 to prevent the articles from moving outwardly from the spiral bed 54 as the articles are being moved thereon. As best illustrated in FIG. 7, those pusher bars 52 which are at the outer side of each of the pusher bar assemblies 34 movably rest upon the upper surface of the spiral bed 54. As the central column 32 is rotated, the engagement of the pusher bars 52 with the upper surface of the spiral support bed 54 causes the endless chain 48 to rotate in the direction illustrated by the arrows in FIG. 7. The chain 48 is freely movable in the pusher bar assembly 34 with the upward movement of the pusher bars 52 along the surface of the spiral support bed 54 causing the rotation of the same. Thus, when the conveyor is being used to elevate articles, the pusher bars 52 will be positioned below (behind) the article and will push the article upwardly along the length of the spiral support bed 54 as the central column 32 is rotated by the motor 22.

If the conveyor is going to be used to lower articles from the upper end to the lower end thereof, the direction of rotation of the central column 32 will be reversed by the motor 22 so that the pusher bars 52 move downwardly along the upper surface of the spiral bed 54. As seen in FIG. 7, a spiral guide 62 extends around central column 32 so that the pusher bars 52 will be pushed downwardly to follow the spiral support bed 54 as the central column is rotated in the said opposite direction. When the conveyor is being used to lower articles, the articles will be positioned below each of the pusher bars 52 if the article is quite large and will not freely slide downwardly on the spiral support bed 54. If the article is fairly small or would freely slide down the spiral support bed 54, the pusher bars 52 would be positioned beneath (below) each of the articles to restrain the movement thereof as the central column is being rotated.

As stated, various types of entry conveyors may be used to supply the articles to the lower end 56 of the spiral support bed 54 when the conveyor is being used to elevate articles 12. However, it is preferred that the construction of the entry conveyor be such as that illustrated in FIGS. 8-13 which is referred to by the reference numeral 18 as previously stated.

Entry conveyor 18 includes a support housing frame 70 include spaced apart frame members 72 and 74. For purposes of description, conveyor 18 will be described as including a discharge end 76. The inlet end of the conveyor 18 is not shown since the conveyor 18 may have any length. Shaft 78 is rotatably mounted in the frame members 72 and 74 adjacent end 76 and has sprocket 80 mounted thereon which receives conveyor chain 82. Conveyor chain 82 is provided with a plurality of spaced apart lugs 84 secured thereto. Chain 82 extends around sprocket 86 mounted on shaft 88 which is rotatably mounted in and which extends between the frame members 72 and 74. Shaft 88 extends outwardly from frame member 74 and has sprockets 90 and 92 mounted thereon which receive chains 94 and 96 respectively. Chain 94 extends forwardly from sprocket 90 and is received by sprocket 98 mounted on shaft 100 which rotatably extends inwardly through frame members 74 and 72.

Figures 10, 11:
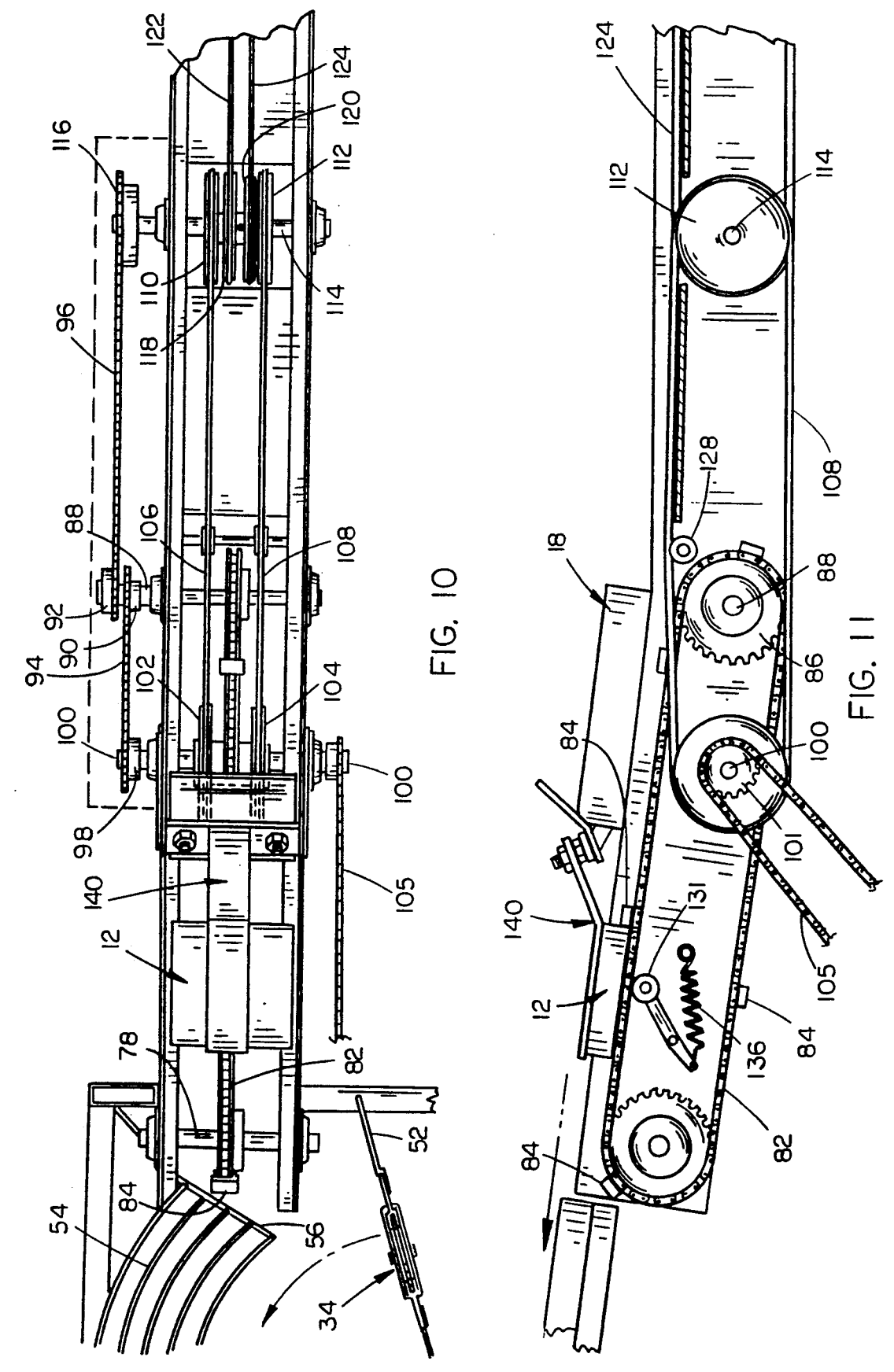

A pair of spaced apart pulleys 102 and 104 are mounted on shaft 100, between frame members 72 and 74, for rotation therewith and have cables or belts 106 and 108 extending therearound as best illustrated in FIG. 10. Shaft 100 also extends outwardly through frame member 72 ad has sprock 101 mounted thereon which receives chain 105. Chain 105 is connected to a suitable drive motor and could be connected to the drive motor 22 if desired or required.

As seen in FIGS. 8 and 10, the belts 106 and 108 extend from the pulleys 102 and 104 and are received by the pulleys 110 and 112 which are mounted on shaft 114 which is rotatably mounted in the frame members 72 and 74. The outer end of shaft 114 has a sprocket 116 mounted thereon which receives the chain 96 as illustrated in FIG. 10. A pair of pulleys 118 and 120 are also mounted on the shaft 114 for rotation therewith and receive cables or belts 122 and 124 therearound as seen in FIG. 10.

A pair of idler pulleys 126 and 128 are mounted on shaft 130 which extends between frame members 72 and 74 and have the belts 106 and lo passing thereover. As best seen in FIG. 11, the idler pulleys 126 and 128 are positioned so that the forward ends of the belts 106 and 108 extend downwardly from the idler pulleys 126 an 128 towards pulleys 102 and 104. As seen in FIG. 11, the arrangement of the various components is such that the belts 106 and 108 extend downwardly and forwardly with opposite sides of the end of the chain 82 so that the articles positioned on the belts 106 and 108 and being moved to the left as viewed in FIG. 11 will be deposited on the upper surface of the chain 82.

Figure 12:
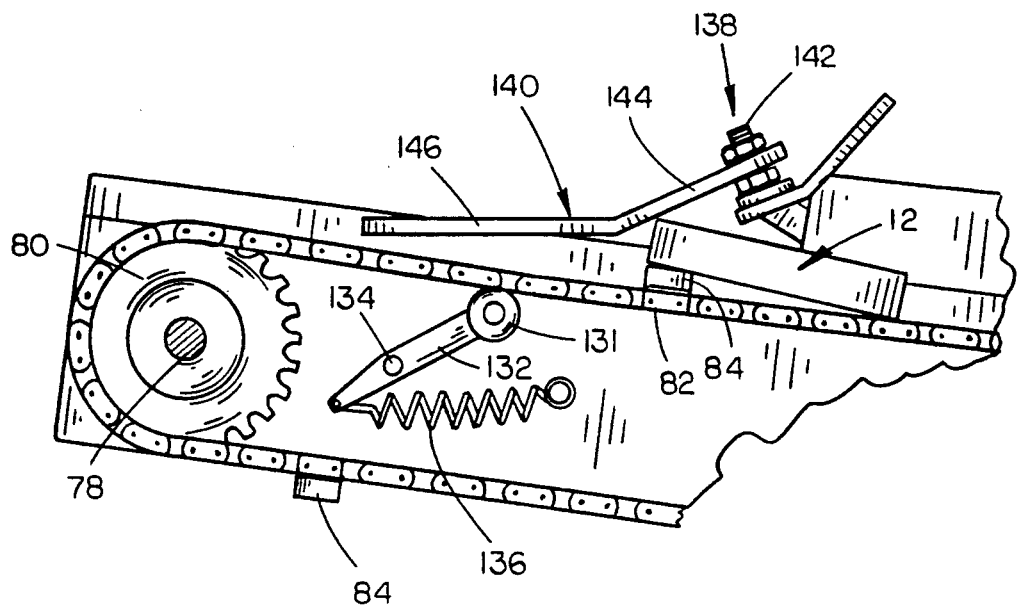
FIG. 12 is a partial vertical sectional view of the entry conveyor.
Figure 13:
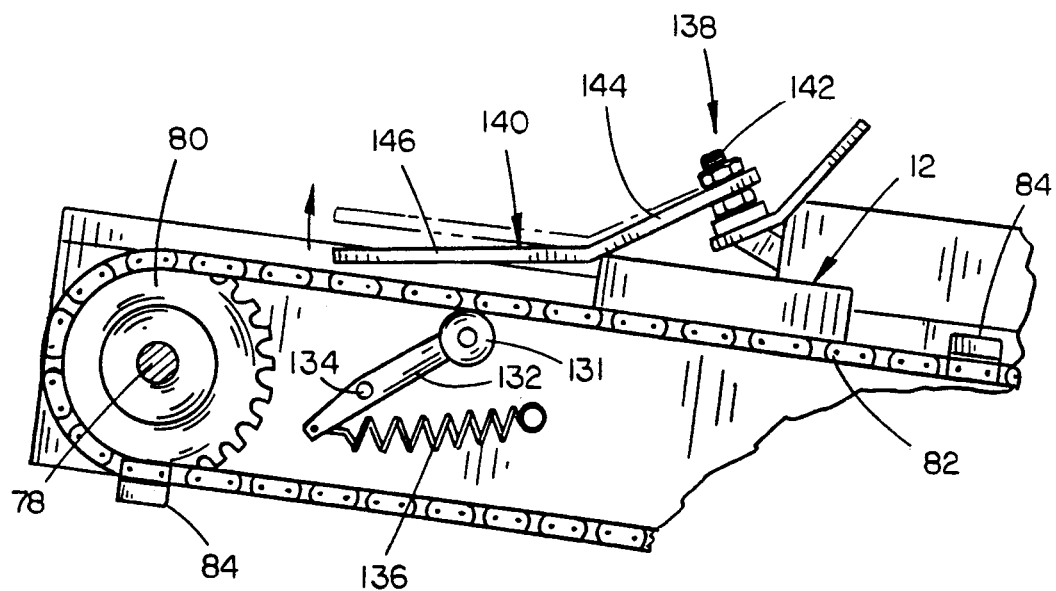
FIG. 13 is a view similar to FIG. 12 but which illustrates the carton on the conveyor having been properly positioned for feeding to the vertical conveyor.

As illustrated in FIGS. 12 and 13, a spring loaded idler pulley or sprocket 131 is rotatably mounted on the end of arm 132 beneath chain 82. Arm 132 is pivoted to housing 70 at 134 and has spring 136 connected, the lower end thereof. Spring 136 urges idler sprocket or pulley 131 upwardly into engagement with the underside of the chain 82.

A positioner and hold down assembly 138 is mounted on housing 70 above chain 82 as best illustrated in FIGS. 12 and 13. Assembly 138 includes a spring finger 140 which is mounted on bolt 142 and which includes upper end portion 144 and a lower end portion 146 which is disposed at an angle with respect to the upper end portion 144. Lower end portion 146 of spring finger 140 is normally disposed as viewed in FIG. 12. When an article 12 is moving to the left on the chain as illustrated in FIG. 12 and is not in the proper position, the spring finger 140 engages the forward end of the article 12 as illustrated in FIGS. 12 and 13 to properly position the article 12 with respect to the lugs 84.

FIG. 12 illustrates one scenario where the forward end of the article 12 is improperly positioned on top of one of the lugs 84. As the upper portion of the chain 82 is moved to the left as viewed in FIG. 12, the spring arm 140 engages the forward end of the article 12 and will yieldably prevent the forward movement of the article 12 on the chain 82 until the article 12 is positioned behind the lug 84. The spring finger 140 continues to prevent the forward movement of the article 12 until a lug 84 moves behind the article 12 and exerts enough forward force on the article 12 to move the article 12 beneath the spring finger 140. The spacing of the lugs 84 on the chain 82 is such that article 12 will be supplied to the lower end 56 of spiral bed 54 in a synchronized fashion with the pusher bar assembly 34 which is being moved into position by the rotating column 32. Without some form of synchronization, the articles 12 would not be supplied to the lower end of the spiral bed 54 in a proper manner. It is important that the article 12 be positioned at the lower end of the spiral bed 54 as a pusher bar assembly 34 is rotated into proper position so that the lowermost pusher bar 52 thereon will be positioned behind the article 12 to properly convey the article upwardly along the spiral support bed 54.

It is preferred that the various sprockets and pulleys be sized such that the belts 106 and 108 are moved at a faster rate than the belts 122 and 124 so that the articles 12 will move forwardly faster on the belts 106 and 108 to properly position the articles relative to the chain 82.

The conveyor of this invention has the capability to store articles and dispense them as needed since only a single article is positioned adjacent each of the pusher bars 52. The conveyor of this invention may elevate or lower an article as described and requires only one moving powered part, that is the rotating central column. The conveyor of this invention will permit the conveying of smaller carton sizes at the rate of approximately 600 to 1000 units per minute. Movement of the articles is continuous as opposed to a stop-start motion.

When the conveyor is to be used to convey different types of unfinished or finished food products such as uncooked chicken, red meat cuts, etc. or cooked hams, chicken, turkey, etc., the pusher bars 52 will be made of a flexible plastic which operate as a squeegee. In such a situation, the spiral support bed 54 will either comprise a solid trough or the rods 56 will be closely spaced together.

Thus it can be seen that the invention accomplishes at least all of its stated objectives.

I claim:

1. A vertical conveyor for conveying articles between vertically disposed locations, comprising:
   a vertically disposed first support means rotatable about a vertical axis and having upper and lower ends;
   a spiral support bed means having upper, lower, inner and outer ends extending around said first support means in a spaced-apart relationship for supporting the articles to be moved from the lower end to the upper end thereof, said spiral support bed means having a top surface upon which the articles are supported,
   means for rotating said first support means with respect to said spiral support bed means,
   means at the outer end of said spiral support bed means for maintaining the articles on said spiral support bed means,
   at least one vertically disposed pusher bar assembly positioned inwardly of said spiral support bed means and secured to said first support means for rotational movement therewith,
   said pusher bar assembly having upper and lower ends,
   said pusher bar assembly including a vertically disposed, movable endless chain means defining a conveying portion and a return portion, said chain means having a plurality of spaced-apart pusher bars secured thereto which extend laterally therefrom so that the said pusher bars, on said conveying portion, movably rest upon said top surface of said spiral support bed means,
   the rotational movement of said first support means in a first direction causing the said pusher bars on the said pushing portion of said chain means to move upwardly along the top surface of said spiral support bed means to engage an article thereon to move the said article for the lower end of said bed means to the upper end of said bed means, an entry conveyor means positioned adjacent the lower end of said spiral support bed means for supplying said articles thereto, said entry conveyor means including a first elongated conveyor having first and second ends, said entry conveyor means also including a second elongated conveyor having first and second ends, said second end of said first conveyor being positioned with respect to said first end of said second conveyor so that articles passing from said second end of first conveyor will be delivered to said first end of said second conveyor, said second end of said second conveyor being positioned adjacent the lower end of said spiral support bed, and said second conveyor including a plurality of spaced apart lugs provided thereon to properly position the article thereon with respect to said pusher bars of said pusher bar assembly to time the delivery of the articles to said pusher bar assembly.

2. The vertical conveyor of claim 1 wherein a hold down assembly is associated with said second conveyor to properly position the articles with respect to said lugs.

* * * * *